United States Patent
Chen et al.

(10) Patent No.: US 7,935,738 B2
(45) Date of Patent: May 3, 2011

(54) TRANSPARENT FLEXIBLE FILM AND FABRICATION METHOD THEREOF

(75) Inventors: Chih-Kuang Chen, Taipei (TW); Shih-Ming Chen, Hsinchu (TW); Jia-Chi Huang, Hsinchu County (TW); Young-Jen Lee, Changhua County (TW); Li-Ching Wang, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 436 days.

(21) Appl. No.: 12/125,328

(22) Filed: May 22, 2008

(65) Prior Publication Data
US 2009/0149564 A1    Jun. 11, 2009

(30) Foreign Application Priority Data
Dec. 5, 2007   (TW) ............................... 96146277 A

(51) Int. Cl.
C08F 2/42 (2006.01)
C08F 2/50 (2006.01)
C08K 3/34 (2006.01)
C08K 9/06 (2006.01)
C09K 19/00 (2006.01)

(52) U.S. Cl. ............... 522/79; 522/71; 522/74; 522/77; 522/88; 522/89; 522/150; 522/151; 522/152; 522/157; 522/178; 522/182; 522/134; 522/135; 522/141; 522/142; 522/144; 428/1.1; 428/411.1; 524/80; 524/442; 524/444; 524/445; 524/1

(58) Field of Classification Search ............... 428/1.1, 428/411.1; 524/1, 80, 442, 444, 445; 522/71, 522/74, 77, 79, 88, 89, 157, 150, 151, 152, 522/178, 182, 134, 135, 141, 142, 144
See application file for complete search history.

(56) References Cited

U.S. PATENT DOCUMENTS

| | | | |
|---|---|---|---|
| 6,730,388 B2 * | 5/2004 | MacQueen et al. | 428/141 |
| 6,790,512 B2 * | 9/2004 | MacQueen et al. | 428/147 |
| 7,329,439 B2 * | 2/2008 | Sachdev et al. | 427/517 |
| 2004/0063817 A1 * | 4/2004 | Ilenda et al. | 523/220 |
| 2004/0097630 A1 * | 5/2004 | Whitman et al. | 524/445 |
| 2005/0070655 A1 * | 3/2005 | Van Den Bergen et al. | 524/445 |
| 2005/0159526 A1 * | 7/2005 | Bernard et al. | 524/442 |
| 2006/0052505 A1 * | 3/2006 | Pagilagan | 524/445 |
| 2008/0193751 A1 * | 8/2008 | Groppel | 428/355 EP |
| 2009/0167993 A1 * | 7/2009 | Chen et al. | 349/96 |

FOREIGN PATENT DOCUMENTS

| | | |
|---|---|---|
| JP | 11129379 | 5/1999 |
| JP | 2005046318 | 2/2005 |
| JP | 2005104133 | 4/2005 |
| JP | 2005200290 | 7/2005 |
| JP | 2005330440 | 12/2005 |
| JP | 2006036923 | 2/2006 |
| JP | 2006077237 | 3/2006 |
| JP | 2006160593 | 6/2006 |
| JP | 2006188408 | 7/2006 |
| JP | 2006188645 | 7/2006 |

OTHER PUBLICATIONS

Rockwood Additives. Laponite-Perfomance-focused attributes in rheology and specialty film forming applications. ChemBrief, Jun. 2001, vol. 1 (2),, pp. 1-2.*
Decker et al. (2002), Ultrafast synthesis of bentonite-acrylate nanocomposite materials by UV-radiation curing. Journal of Material Science. vol. 37, No. 22, pp. 4831-8383.*
Blumstein, A. (1965), Polymerization of adsorbed monolayers. II. Thermal degradation of the inserted polymer. Journal of Polymer Science Part A: General Papers, 3: 2665-2672.*
Blumstein, A. (1965), Polymerization of adsorbed monolayers. I. Preparation of the clay-polymer complex. Journal of Polymer Science Part A: General Papers, 3: 2653-2664.*
Benfarhi et al (Mar. 2004), Synthesis of clay nanocomposite materials by light-induced crosslinking polymerization European Polymer Journal, vol. 40, Issue 3, pp. 493-501.*
Uhl et al. (2004). Polymer Films Possesing Nanoreinforcements via organically Modified Layered Silicate. Chemistry of Materials, vol. 16, No. 6, pp. 1135-1142.*
Decker et al. (2005), Synthesis of nanocomposite polymers by UV-radiation curing. Polymer, vol. 46, Issue 17,pp. 6640-6648.*
Huimin et al. (2002), A study on the preparation of polymer/montmorillonite nano-composite materials by photo-polymerization. Polymer International, 51: 7-11.*
Inceoglu et al. (2009) Effect of Organoclay on the Physical Properties of UV-curable Coatings. Nanoteachnology Applications in Coatings. Chapter 13, pp. 255-273.*
Keller et al. (2004), Synthesis of polymer nanocomposites by UV-curing of organoclay—acrylic resins Original Research Article Polymer, vol. 45, Issue 22, Oct. 13, 2004, pp. 7437-7447.*
Alexandre and Dubios. (2000). Polymer-layered silicate nanocomposites: preparation, properties and uses of a new class of materials Original Research Article. Materials Science and Engineering: R: Reports, vol. 28, Issues 1-2, pp. 1-63.*
English Abstracts of JP Patents.

* cited by examiner

Primary Examiner — Sanza L McClendon
(74) Attorney, Agent, or Firm — Thomas/Kayden

(57) ABSTRACT

A transparent flexible film is provided, formed by curing a composition, comprising: about 40-75 parts by weight of a clay; about 15-45 parts by weight of a water-soluble polymer; about 1-10 parts by weight of a mono-functional acrylic oligomer of formula (I), wherein $n_1$ is an integer 2-25, $R_1$ is $C_{1-10}$ alkyl or H, and $R_2$ is H or $CH_3$; and about 10-45 parts by weight of a bi-functional acrylic oligomer of formula (II), wherein $n_2$ is an integer 3-50, $R_3$ and $R_4$ are H or $CH_3$.

24 Claims, 5 Drawing Sheets

TRANSPARENT FLEXIBLE FILM AND FABRICATION METHOD THEREOF

CROSS REFERENCE TO RELATED APPLICATIONS

This Application claims priority of Taiwan Patent Application No. 96146277, filed on Dec. 5, 2007, the entirety of which is incorporated by reference herein.

BACKGROUND OF THE INVENTION

1. Field of the Invention

The present invention relates to flexible electronic products, and in particular relates to transparent flexible films made from clay.

2. Description of the Related Art

Flexible electronic products are different from traditional electronic products, such as, they are often lighter, flexible, and more mobile, and fabrication procedure thereof is simpler. Additionally, due to the characteristics of flexible electronic products, application is broader. However, plastic material used for flexible electronic products must succumb to strict requirements to ensure stability and high yield rate for the flexible electronic products. Examples of strict requirements include high transmittance, high flexibility, high gas resistance, high water resistance and low coefficient of thermal expansion (CTE). Because of the growing importance and usage of flexible electronic products, development of high performance materials meeting the above requirements is urgently needed.

Although polymer material has high flexibility, the molecular structure thereof has large free space, thus, gas resistance, water resistance and coefficient of thermal expansion of the polymer material do not meet strict flexible electronic product requirements. Therefore, development has focused on adding inorganic particles to the polymer material to maintain the flexibility of the polymer material and improve various properties.

Recently, introducing clay into the polymer material to raise various properties has been a popular issue. Clay has properties of low cost, high anisotropic ratio and high heat resistance, etc. and may improve properties of gas resistance, high water resistance and heat resistance of polymer material.

The main development of clay composite material techniques comprises surface modification of clay in melting polymer and monomer intercalation. However, the clay in the polymer material can not be delaminated completely and properly orientated, which causes ineffective blending ratio of clay. If blending ratio of clay is 20-30% in polymer material, the polymer material will lose transmittance properties.

BRIEF SUMMARY OF THE INVENTION

The invention provides a transparent flexible film formed by curing a composition, comprising: about 40-75 parts by weight of a clay; about 15-45 parts by weight of a water-soluble polymer; about 1-10 parts by weight of a mono-functional acrylic oligomer of formula (I):

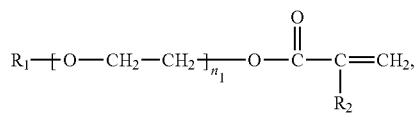

wherein $n_1$ is an integer 2-25, $R_1$ is $C_{1-10}$ alkyl or H, and $R_2$ is H or $CH_3$; and about 10-45 parts by weight of a bi-functional acrylic oligomer of formula (II):

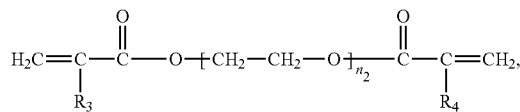

wherein $n_2$ is an integer 3-50, $R_3$ and $R_4$ are H or $CH_3$.

The invention further provides a method for forming a transparent flexible film, comprising: (a) providing a suspension containing a clay; (b) adding a mono-functional acrylic oligomer of formula (I):

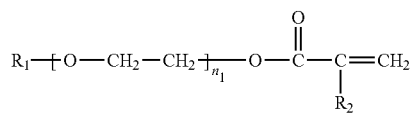

into the suspension as a lubricant to be adhered to the clay; wherein $n_1$ is an integer 2-25, $R_1$ is $C_{1-10}$ alkyl or H, and $R_2$ is H or $CH_3$; (c) adding a water-soluble polymer into the suspension as an adhesive agent; (d) adding a bi-functional acrylic oligomer of formula (II):

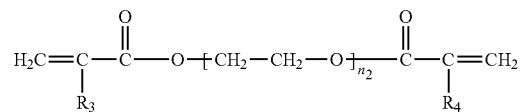

into the suspension as a crosslink agent, wherein $n_2$ is an integer 3-50, $R_3$ and $R_4$ are H or $CH_3$; (e) after the step (d), drying the suspension into a film; and (f) exposing the film under UV light to cure the film.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a transparent flexible film using clay as main material. Accordingly, the method of the invention allows clay to be delaminated completely and properly orientated. In the method of the invention, a water-soluble polymer plays the role of an adhesive agent and ties into a mono-functional acrylic oligomer and bi-functional acrylic oligomer to raise the flexibility and water resistance of the clay composite material. After the clay composite material is formed into a film, the film is exposed under UV light to form the crosslink structure around the aggregations of clay. The resulting composite material with high content of clay has excellent flexibility, orientation and transmittance, and because of the high content of clay, the gas resistance and heat resistance are effectively raised and coefficient of thermal expansion of the composite material is noticeably decreased. Moreover, organic solvent is not necessary to be used in the method of the invention. Thus the method of the invention is advantageous in environmental benign and low cost.

Figure 1:
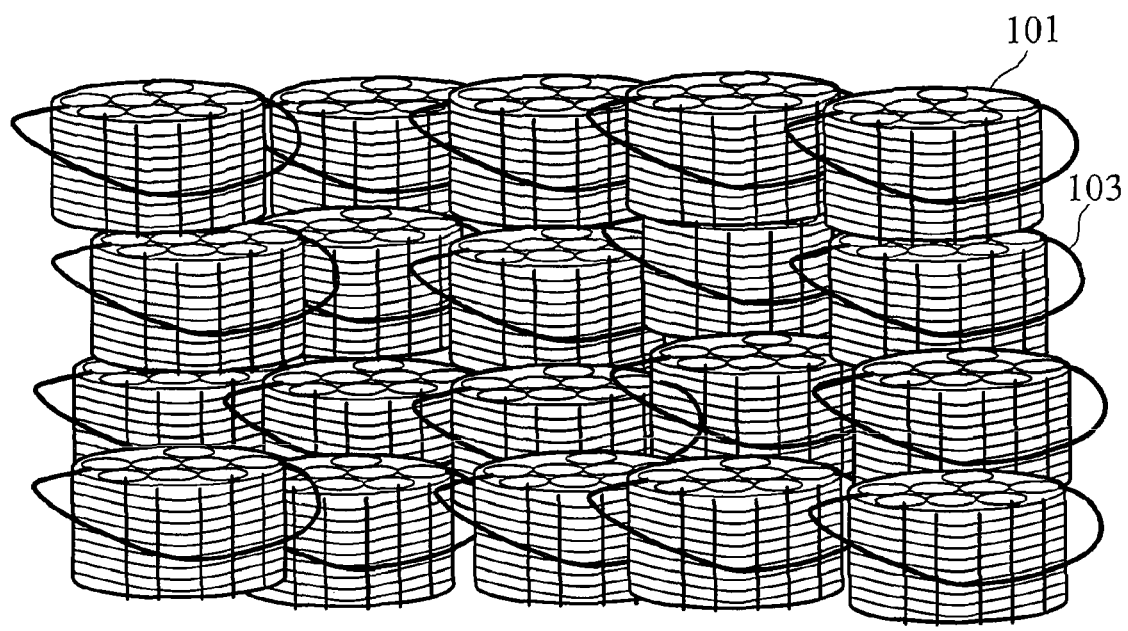
FIG. 1 shows the structure of clay aggregation composing the film of the invention.
Figure 2:
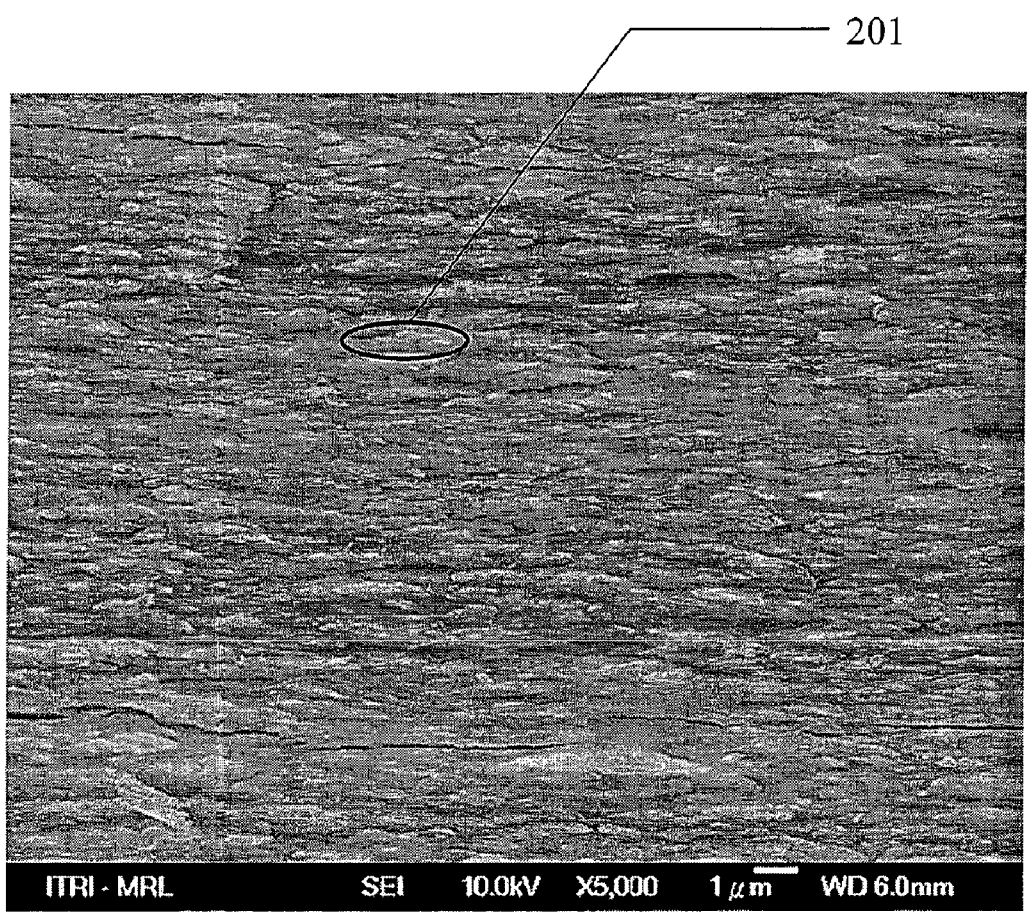
FIG. 2 is a scanning electron microscope (SEM) image of the film of the invention.
Figure 3:
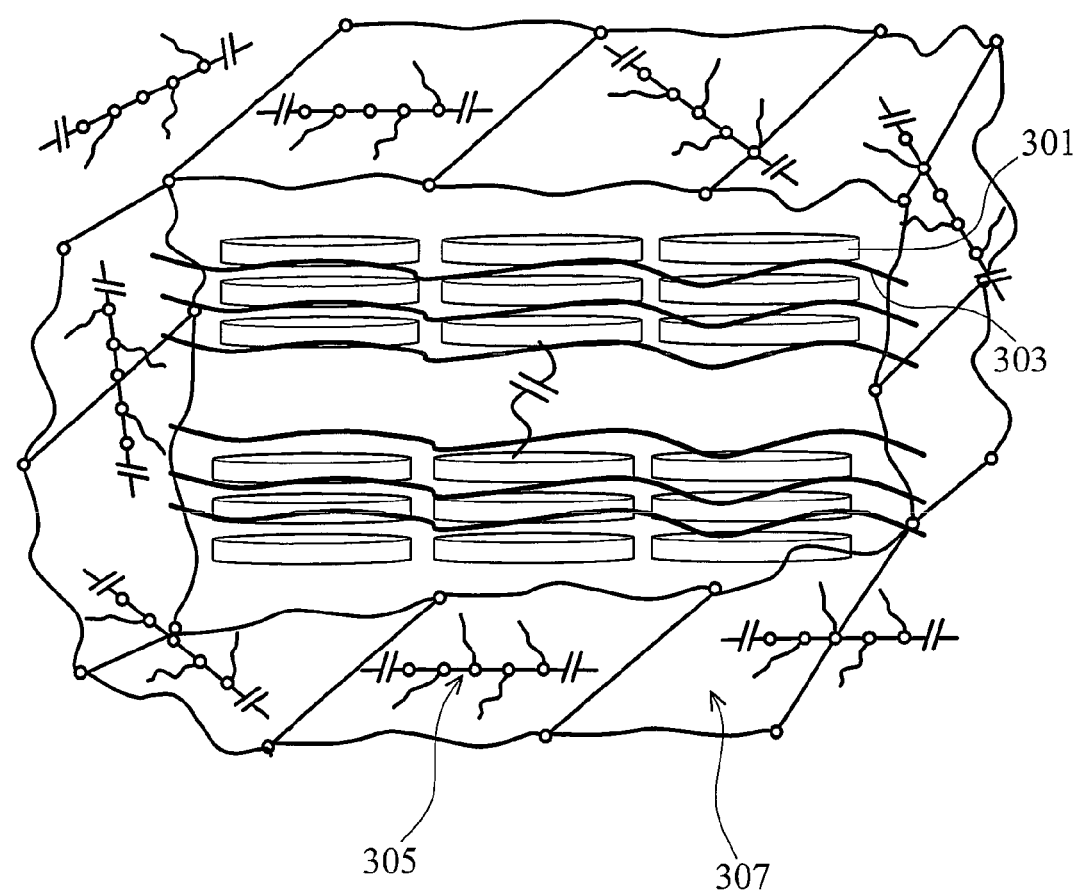
FIG. 3 shows the detailed structure of the clay aggregation.

FIG. 1 shows the structure of clay aggregation composing the film of the invention. The diameter size and thickness of the clay aggregation are 2-4 μm and 0.3-0.5 μm, respectively. In FIG. 1, element 103 represents the crosslink structure formed by a bi-functional acrylic oligomer. The size of the clay aggregation may be understood from FIG. 2, which is a scanning electron microscope (SEM) image of the film of the invention. In FIG. 2, element 201 is a single layer clay aggregation and which is composed by stacking 3000-9000 pieces of circular clay. Furthermore, FIG. 3 shows the detailed structure of the clay aggregation. A water-soluble polymer 303 is inserted into the clay 301 as an adhesive agent and a mono-functional acrylic oligomer 305 acts as a lubricant to fill in defects between clay aggregations to release the microscopic stress caused by defects. After the clay composite material is curd by UV light, the crosslink structure 307 formed by the mono-functional acrylic oligomer raises the water resistance of the clay composite material.

First, a clay and water is prepared as a suspension and the content of the clay I and the water is about 4-10%, preferably about 10%. The clay may comprise laponite, mica, vermiculite, montmorillonite, bentonite, saponite or hectorite. In one embodiment, clay comprises laponite.

Then, a mono-functional acrylic oligomer is added into the suspension containing the clay as a lubricant to be adhered to the clay. The structure of the mono-functional acrylic oligomer is shown as formula (I), wherein $n_1$ is an integer 2-25, $R_1$ is $C_{1-10}$ alkyl or H, and $R_2$ is H or $CH_3$.

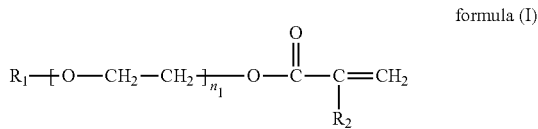

formula (I)

The molecular weight of the mono-functional acrylic oligomer mentioned above is about 100-1000, preferably, about 188. In one embodiment, $n_1$ is 2, $R_1$ is $C_2H_5$ or H, and $R_2$ is H and the compound of that is EOEOEA.

Next, a water-soluble polymer is added into the suspension as an adhesive agent. The water-soluble polymer may comprise polyethylene oxide (PEO), polyvinyl alcohol (PVA), polyacrylic acid (PAA), polyvinyl pyrrolidone (PVP), water-solubility starch, hydroxypropyl methyl cellulose (HPMC) or chitosan. In one embodiment, the water-soluble polymer is polyethylene oxide. The molecular weight of polyethylene oxide is about 100000-5000000, preferably, about 800000-1000000.

Then a bi-functional acrylic oligomer is added into the suspension as a crosslink agent. The structure of the mono-functional acrylic oligomer is shown as formula (II), wherein $n_2$ is an integer 3-50, $R_3$ and $R_4$ are H or $CH_3$.

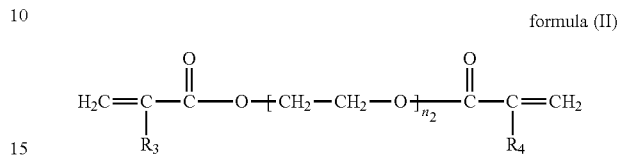

formula (II)

The molecular weight of the bi-functional acrylic oligomer mentioned above is about 200-2500, preferably, about 1166. In one embodiment, $n_2$ is 23, $R_3$ and $R_4$ are $CH_3$, and the compound of that is EGMA23.

Then the suspension is dried into a film. For example, the suspension may be poured into a high density polyethylene (HDPE) mold to be dried into a film, and the drying temperature may be kept at 30-50° C., the drying time is about 8 hours to 3 days. Furthermore, the suspension also may be coated on a substrate to be dried into a film. The commercial material named Arton (produced by JSR) may be used as substrate. The applying step may comprise applying the suspension on a substrate by using a scraper.

Finally, the film is exposed under UV light to be cured to obtain a transparent flexible film of the invention.

The amounts of the clay, water-soluble polymer, mono-functional acrylic oligomer of formula (I) and a bi-functional acrylic oligomer of formula (II), are about 40-75 parts by weight, about 15-45 parts by weight, about 1-10 parts by weight and about 10-45 parts by weight, respectively, and preferably.

In addition, a photoinitiator may be added into the suspension optionally at the step of adding the bi-functional acrylic oligomer into the suspension. The photoinitiator is present at about ⅟₁₀ of the total mount of the mono-functional acrylic oligomer of formula (I) and the bi-functional acrylic oligomer of formula (II).

In order to accelerate the step of drying the suspension into the film, a co-solvent is added into the suspension optionally before the step of adding the mono-functional acrylic oligomer into the suspension. The co-solvent may comprise methanol, ethanol or isopropanol.

The transmittance and haze of the transparent flexible film made through the method mentioned previously are greater than about 80% and less than about 10%, respectively.

The elongation percentage of the transparent flexible film is about 100-1000% and the yield strength of the transparent flexible film is no less than about 0.7 Kgf/mm2, for example 0.7-1.3 Kgf/mm2. Moreover, the coefficient of thermal expansion of the transparent flexible film is about 5-100 ppm, preferably less than 50 ppm at 30-200° C. The cracking temperature of the transparent flexible film of the invention is greater than 300° C.

A layer of hydrophobic polymer may be applied on the surface of the film of the invention, wherein the hydrophobic polymer such as Parylene, epoxy resins, acrylic resins and PU resins, etc. may make the film of the invention have excellent properties of gas resistance, water resistance, transmittance and dimensional stability to heating. Furthermore, because the film of the invention has high flexibility, it may be applied in various industries, especially for flexible electronic substrate material.

EXAMPLE

Comparative Example 1

Preparation and Analysis of Laponite/PEO Film

Laponite was added into the water to form a suspension and then PEO was added into the suspension

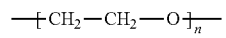

PEO, molecular weight: 900000) to form a laponite/PEO suspension. Next, the laponite/PEO suspension was poured into the high density polyethylene (HDPE) mold to be dried at 30° C. for 3 days. The ingredients are listed in Table 1.

TABLE 1

The ingredients of laponite/PEO film

| Sample | Clay (parts by weight) | laponite (g) | water (g) | PEO (g) |
|---|---|---|---|---|
| Comparative Example 1-1 | 40 | 6 | 144 | 9 |
| Comparative Example 1-2 | 55 | 6 | 144 | 5 |
| Comparative Example 1-3 | 75 | 6 | 144 | 2 |

The test result showed that the film having only 40 parts by weight of clay, had flexibility, wherein if the clay content is higher than 40 parts by weight, the film will be broken. Therefore, only the film which had 40 parts by weight of clay was analyzed. The analysis results of the film which had 40 parts by weight of clay are shown in Table 2. Laponite/PEO film had many problems. For example, the crystallization by PEO lowered the transmittance of the film. Besides, high coefficient of thermal expansion of the film existed at the range of the melting point. Moreover, the film did not have water resistance and the elongation percentage of the film was low. Therefore, laponite/PEO film did not meet optical film requirements. Water resistance test was performed by immersing the films (2 cm×2 cm) into water and then the properties and weight of the films were measured.

Comparative Example 2

Forming Crosslink Structure in the Film by Bi-Functional Acrylic Oligomer to Improve the Water Resistance of the Film Because the water resistance of laponite/PEO film is bad, bi-functional acrylic oligomer, EGMA23, was added into the ingredients of the film to form the crosslink structure to improve the water resistance of the film. The structure of EGMA23 is shown in formula (III).

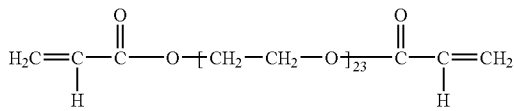

formula (III)

The preparation of the film is described in the following. The laponite was added into the water and mixed under vigorous agitation to form a light blue transparent suspension, and the PEO was added into the suspension until the PEO was dissolved completely, along with EGMA23 and a photoinitiator (73W, Double Bond Chemical, Taiwan). Photoinitiator 73W was present at about 1/10 of the mount (weight) of the bi-functional acrylic oligomer. Different experiment conditions and ingredients are shown in Table 3. After the suspension was completely prepared, the suspension was poured into the high density polyethylene (HDPE) mold to be dried in a oven at 30° C. for 3 days and then the transparent film was obtained. Next, the film was exposed under UV light to be cured and crosslinked. The conditions of the step of exposing the film under UV light are shown as below: rate: 2 m/minutes; the two sides of the film was exposed under UV light for two times (energy: 12 J/cm$^2$).

TABLE 3

The ingredients of clay film containing EGMA23

| Sample | laponite (g) | Water (g) | PEO (g) | EGMA23 (g) | 73W (g) |
|---|---|---|---|---|---|
| Comparative Example 2-1 (40 parts by weight of clay) | 6 | 144 | 6 | 3 | 0.3 |
| Comparative Example 2-2 (40 parts by weight of clay) | 6 | 144 | 7.5 | 1.5 | 0.15 |

TABLE 2

Physical properties of laponite/PEO film

| Sample | Clay (parts by weight) | Coefficient of thermal expansion (μm/m° C.) | Transmittance (%)/Haze | Yield strength (Kgf/mm$^2$) | elongation (%) | Water resistance | PEO structure |
|---|---|---|---|---|---|---|---|
| Comparative Example 1-1 | 40 | 167 (40~80° C.) 14.43 (80~300° C.) | 85.41/48.52 | 0.93 | 11 | In 30 minutes, the film was dissolved completely at room temperature | crystallized |
| Comparative Example 1-2 | 55 | | | | undetectable | | |
| Comparative Example 1-3 | 75 | | | | undetectable | | |

TABLE 3-continued

The ingredients of clay film containing EGMA23

| Sample | laponite (g) | Water (g) | PEO (g) | EGMA23 (g) | 73W (g) |
|---|---|---|---|---|---|
| Comparative Example 2-3 (67 parts by weight of clay) | 6 | 144 | 2 | 1 | 0.1 |
| Comparative Example 2-4 (67 parts by weight of clay) | 6 | 144 | 2.5 | 0.5 | 0.05 |

The experiment results of the films made from the ingredients of Table 3 is listed in Table 4. The film which had a high content of clay (67 parts by weight of clay) was too brittle to form a complete film. If the content of clay was decreased to 40 parts by weight of clay, then the complete film could be obtained. The transmittance of films of Comparative Examples 2-1 and 2-2 was better than the laponite/PEO film. However, the coefficient of thermal expansion of the films of Comparative Examples 2-1 and 2-2 dramatically increased at the range of the melting point of PEO. The rapid increase of CTE was due to the large amount of PEO crystallization. It was supposed that the PEO crystallization was mainly caused by the excess PEO excluded from clay layers. And this kind of excess PEO chain can pack and align without the constraint of clay. For mechanical properties, the elongation percentage of the clay film containing EGMA23 was better than the laponite/PEO film and the yield strength of the clay film containing EGMA23 was similar to the laponite/PEO film. The water resistance test was performed by the same method as Comparative Example 1. The results showed that the films of the four Comparative Examples listed in Table 3 only swelled slightly after being immersed into water for one week. And the films of the four Comparative Examples listed in Table 3 compared to the laponite/PEO (being dipped into water for 30 minutes, whereby the film was dissolved completely at room temperature), showed that water resistance increased substantially.

TABLE 4

Physical properties of clay film containing EGMA23

| Sample | Coefficient of thermal expansion (μm/m° C.) | Transmittance (%)/Haze | Yield strength (Kgf/mm²) | elongation (%) | Water resistance |
|---|---|---|---|---|---|
| Comparative Example 2-1 | 127.6 (40~80° C.) 14.43 (80~300° C.) | 88.84/46.41 | 0.93 | 53 | ◯ |
| Comparative Example 2-2 | 84.33 (40~85° C.) 4 (85~300° C.) | 90.32/46.91 | 0.78 | 174 | ◯ |
| Comparative Example 2-3 | | undetectable | | | ◯ |
| Comparative Example 2-4 | | undetectable | | | ◯ |

□: excellent;
▫: good;
◯: normal;
▪: bad

Comparative Example 3

Improving the Elongation of the Film by Mono-Functional Acrylic Oligomer

To maintain the high flexibility of a clay film containing high fraction of clay, a mono-functional acrylic oligomer, EOEOEA, was added into the clay film ingredients as a lubricant. The structure of EOEOEA is shown in formula (IV).

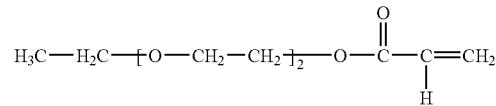

formula (IV)

First, EOEOEA in the clay suspension adhered to the surface of the clay. After the adhesive agent, PEO, was inserted into the space between the layers of clay, EOEOEA was excluded to the surroundings of the clay aggregation so that the microcosmic stress problem was solved because of the lubricant effect of EOEOEA at the defects. Therefore, the film had better flexibility and elongation. For reference of the concept, refer to FIG. 1. The ingredients are listed in Table 5. The clay was added into water to form a suspension, and then a certain amount of EOEOEA was added into the suspension to adsorb on the clay surface for 24 hours. Next, a fixed amount of PEO was added into the suspension and then photoinitiator 73W was added into the suspension. Photoinitiator 73W was present at about 1/10 of the amount (weight) of the mono-functional acrylic oligomer. The step of drying and curing the film is the same as the step used for Comparative Example 2.

TABLE 5

The ingredients of clay film containing EOEOEA

| Sample | laponite (g) | Water (g) | PEO (g) | EOEOEA (g) | 73W (g) |
|---|---|---|---|---|---|
| Comparative Example 3-1 (40 parts by weight of clay) | 6 | 144 | 8.8 | 0.2 | 0.02 |
| Comparative Example 3-2 (40 parts by weight of clay) | 6 | 144 | 8.6 | 0.4 | 0.04 |

TABLE 5-continued

The ingredients of clay film containing EOEOEA

| Sample | laponite (g) | Water (g) | PEO (g) | EOEOEA (g) | 73W (g) |
|---|---|---|---|---|---|
| Comparative Example 3-3 (40 parts by weight of clay) | 6 | 144 | 8.4 | 0.6 | 0.06 |

Table 6 shows that EOEOEA increased the elongation ability of the film substantially (from 11% to 1110%) and did not influence the transmittance and yield strength of the film for the film containing 40 parts by weight of clay with EOEOEA compared to laponite/PEO film (Table 1). The coefficient of thermal expansion of the film at the range of melting point presented a maximum value, and that meant the all films of Comparative Examples 3-1 to 3-3 still had a great quantity of crystallized areas.

On the other hand, although films containing EOEOEA had excellent elongation ability, the water resistance thereof was very bad. The film containing EOEOEA was immersed into water for 30 minutes and then it was dissolved complete. That meant that without EGMA23 in the film to form the crosslink structure, the film could not have water resistance.

TABLE 6

Physical properties of clay film containing EOEOEA

| Sample | Coefficient of thermal expansion (μm/m° C.) | Transmittance (%)/Haze | Yield strength (Kgf/mm²) | elongation (%) | Water resistance |
|---|---|---|---|---|---|
| Comparative Example 3-1 (40 parts by weight of clay) | 96.55 (50-70° C.) 1.663 (70-300° C.) | 89.78/34.39 | 0.94 | 1100 | V |
| Comparative Example 3-2 (40 parts by weight of clay) | 157.1 (50-70° C.) 14.43 (70-300° C.) | 89.29/38.03 | 1.3 | 650 | V |
| Comparative Example 3-3 (40 parts by weight of clay) | 123 (49-66° C.) | 88.93/45.07 | 0.77 | 251 | V |

ŀ: excellent;
Δ: good;
o: normal;
V: bad

Example

Film with High Content of Clay Had Water Resistance and Flexibility

As the Comparative Examples mentioned previously, the crosslink structure formed by EGMA23 promoted the water resistance of film to be raised and EOEOEA improved the elongation ability of the film. Thus the two kinds of oligomers were added into the ingredients of clay film together to form the complex ingredients of the film. The complex ingredients are listed in Table 7. First, the suspension containing clay was prepared, and then EOEOEA was added into the suspension to adsorb on the clay for 24 hours. Next, water-soluble polymer, PEO, was added into the suspension. After the PEO was dissolved completely, EGMA23 and photoinitiator 73W was added into the suspension. Photoinitiator 73W was present at about 1/10 of the total amount (weight) of the mono-functional acrylic oligomer and the bi-functional acrylic oligomer. The step of drying and curing the film was the same as the step used for Comparative Examples 2 and 3.

TABLE 7

The ingredients of clay film containing EGMA23 and/or EOEOEA

| Sample | laponite (g) | Water (g) | PEO (g) | EOEOEA (g) | EGMA23 (g) | 73W (g) |
|---|---|---|---|---|---|---|
| Example 1 (40 parts by weight of clay) | 6 | 144 | 5.8 | 0.2 | 3 | 0.32 |
| Example 2 (55 parts by weight of clay) | 6 | 144 | 4.7 | 0.2 | 0 | 0.02 |
| Example 3 (55 parts by weight of clay) | 6 | 144 | 3.1 | 0.2 | 1.6 | 0.18 |
| Example 4 (55 parts by weight of clay) | 6 | 144 | 3.1 | 0.2 | 1.6 | 0.18 |

Table 8 showed that for the film containing 40 parts by weight of clay (Example 1) at 50-70° C. (the range of the melting point of PEO), the coefficient of thermal expansion increased substantially, that is measured by thermal mechanical analyzer (TMA). The differential scanning calorimetry (DSC) was used to determine endothermic and exothermic characteristics of the film containing 40 parts by weight of clay (Example 1). Therefore, the crystallinity property of the film containing clay can be determined by measuring the endothermic and exothermic peaks from DSC curve. Moreover, in the melting range of PEO, the PEO still crystallized (data is not shown) and the coefficient of thermal expansion of the film increased substantially. When the content of clay was increased to 55 parts by weight in the film, the crystallizing of PEO were inhibited effectively. Lubricant, EOEOEA, made the film containing 55 parts by weight of clay still have excellent flexibility, such as Example 2 in Table 8.

Figure 4:
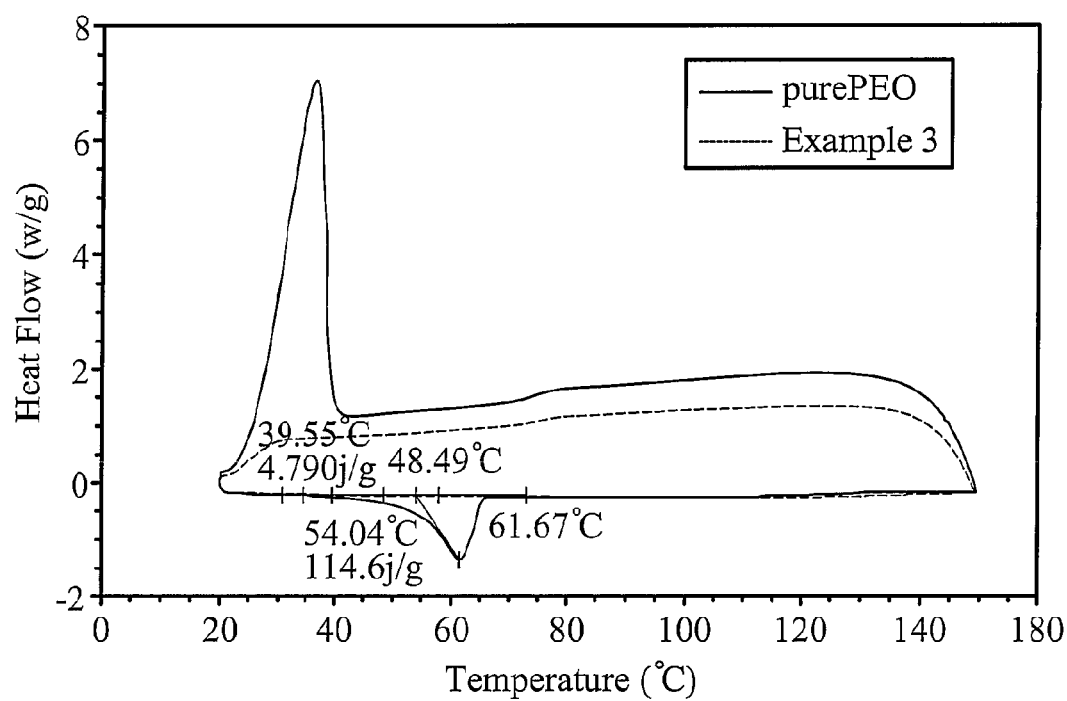
FIG. 4 shows the analysis results of pure PEO and Example 3 by differential scanning calorimetry.
Figure 5:
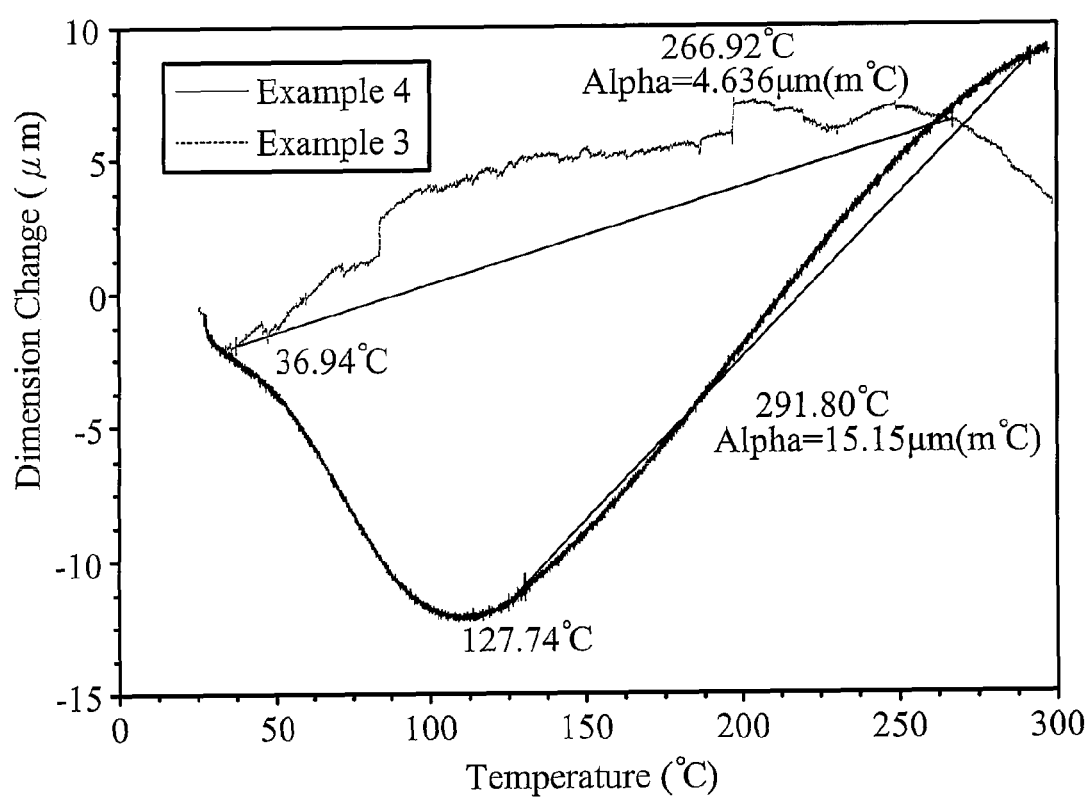
FIG. 5 shows the thermal expansion curves for Example 4 and Example 3

Example 3 explained that after EGMA23 was added, the crosslink structure therefrom inhibited the crystallizing of PEO completely. FIG. 4 shows the analysis results of pure PEO and Example 3 by differential scanning calorimetry. The peak of the crystal was not present in Example 3 and that meant there was no PEO crystal in the film of Example 3. Pure PEO presented obvious peaks of melting and crystallizing. FIG. 5 shows the thermal expansion curves for Example 4 and Example 3. FIG. 5 also shows that the coefficient of thermal expansion of the film of Example 4 and Example 3 without PEO crystal may be controlled to less than 15.

The Example 4 was obtained by using the ingredients of Example 3 and changing the procedure for forming the film. For forming the film, the suspension of Example 3 was applied on the arton substrate by a scraper. The conditions of drying the suspension into a film changed to be 50° C. for 40 minutes, 40° C. for 20 minutes and then 30° C. for 20 minutes. The transmittance of the film obtained through the method mentioned above (Example) was increased and the transmittance of the film was greater than 92%. Furthermore the haze of the film was decreased to less than 2.3.

TABLE 8

Physical properties of clay film containing EGMA23 and/or EOEOEA

| Sample | Coefficient of thermal expansion ($\mu m/m° C.$) | Transmittance (%)/Haze | Yield strength ($Kgf/mm^2$) | elongation (%) | Water resistance | PEO structure |
|---|---|---|---|---|---|---|
| Example 1 | 111.6 (50-70° C.) 6.72 (70-300° C.) | 90.45/40.94 | 0.9 | 680 | ○ | crystallized |
| Example 2 | 242.9 (30-60° C. | 90.95/46.11 | 1.1 | 750 | V | partially crystallized |
| Example 3 | 5.03 (30-60° C.) | 91.11/39.44 | 1.0 | 985 | ○ | uncrystallized |
| Example 4 | 15 (30-260° C.) | 92.18/2.3 | 1.2 | 1002 | ○ | uncrystallized |

⊹: excellent;
Δ: good;
○: normal;
V: bad

The Use of Co-Solvent and the Effect Thereof

Because the main solvent for forming the film in the invention is water (about 80-90 parts by weight for all ingredients), the drying took a long time and the heating temperature was limited, otherwise defects would be occur on the surface of the film. Therefore, a co-solvent may be added in to the ingredients (suspension) of the invention optionally, such as ethanol to increase the rate of drying. First, 15 g of laponite was added into 135 g of water to form the laponite suspension. Meanwhile, a mixture solvent of ethanol and water was prepared and the mixing ratio of ethanol to water was 45 g of ethanol to 105 g of water. Then the mixture solvent of ethanol and water was dropped into the laponite suspension and at the same time the laponite suspension was stirred vigorously. Then a stable laponite suspension was obtained. Next, 0.5 g of EOEOEA was added into the suspension and then the suspension was stirred for 24 hours to let the EOEOEA adhere to the laponite completely. After that, 8 g of PEO was added into the suspension, until PEO was dissolved completely. 4 g of EGMA23 and 0.4 g of 73W were added into the suspension. Then the suspension was poured into the high density polyethylene (HDPE) mold to be dried at 30° C. Only after one day the dried film was obtained. Finally, the film was exposed under UV light to be cured and the film having good quality of the invention was obtained.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transparent flexible film formed by curing a composition, comprising:

about 40-75 parts by weight of a clay;

about 15-45 parts by weight of a water-soluble polymer;

about 1-10 parts by weight of a mono-functional acrylic oligomer of formula (I)

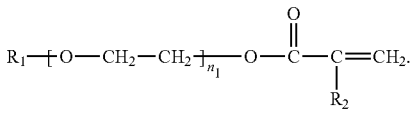

wherein $n_1$ is an integer 2-25, $R_1$ is $C_{1-10}$ alkyl or H, and $R_2$ is H or $CH_3$; and about 10-45 parts by weight of a bi-functional acrylic oligomer of formula (II)

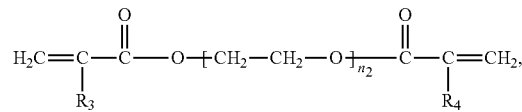

wherein $n_2$ is an integer 3-50, $R_3$ and $R_4$ are H or $CH_3$.

2. The transparent flexible film as claimed in claim 1, wherein the composition further comprises a photoinitiator.

3. The transparent flexible film as claimed in claim 2, wherein the photoinitiator is present at about 1/10 of the total mount of the mono-functional acrylic oligomer of formula (I) and the bi-functional acrylic oligomer of formula (II).

4. The transparent flexible film as claimed in claim 1, wherein the clay comprises laponite, mica, vermiculite, montmorillonite, bentonite, saponite or hectorite.

5. The transparent flexible film as claimed in claim 4, wherein the clay comprises laponite.

6. The transparent flexible film as claimed in claim 1, wherein the water-soluble polymer comprises polyethylene oxide, polyvinyl alcohol, polyacrylic acid, polyvinyl pyrrolidone, water-solubility starch, hydroxypropyl methyl cellulose or chitosan.

7. The transparent flexible film as claimed in claim 6, wherein the water-soluble polymer comprises polyethylene oxide.

8. The transparent flexible film as claimed in claim 7, wherein a molecular weight of the polyethylene oxide is about 100000-5000000.

9. The transparent flexible film as claimed in claim 1, wherein $n_1$ is 2, $R_1$ is $C_2H_5$ and $R_2$ is H in the formula (I).

10. The transparent flexible film as claimed in claim 1, wherein $n_2$ is 23, $R_3$ and $R_4$ are $CH_3$ in the formula (II).

11. The transparent flexible film as claimed in claim 1, wherein a transmittance of the transparent flexible film is greater than about 80%.

12. The transparent flexible film as claimed in claim 1, wherein a haze of the transparent flexible film is less than about 10.

13. The transparent flexible film as claimed in claim 1, wherein an elongation percentage of the transparent flexible film is about 100-1000%.

14. The transparent flexible film as claimed in claim 1, wherein a yield strength of the transparent flexible film is greater than about 0.7 Kgf/mm².

15. The transparent flexible film as claimed in claim 1, wherein a coefficient of thermal expansion of the transparent flexible film is about 5-100 ppm at 30-200° C.

16. A method for forming a transparent flexible film, comprising:
(a) providing a suspension containing a clay;
(b) adding a mono-functional acrylic oligomer of formula (I) into the suspension as a lubricant to be adhered to the clay

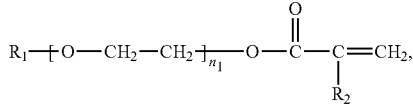

wherein $n_1$ is an integer 2-25, $R_1$ is $C_{1-10}$ alkyl or H, and $R_2$ is H or $CH_3$;
(c) adding a water-soluble polymer into the suspension as an adhesive agent;

(d) adding a bi-functional acrylic oligomer of formula (II) into the suspension as a crosslink agent

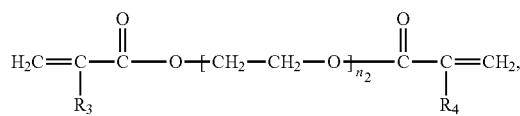

wherein $n_2$ is an integer 3-50, $R_3$ and $R_4$ are H or $CH_3$;
(e) after the step (d), drying the suspension into a film; and
(f) exposing the film under UV light to cure the film.

17. The method for forming a transparent flexible film as claimed in claim 16, further comprising, before the step (b), adding a co-solvent in the suspension to accelerate the drying of the suspension.

18. The method for forming a transparent flexible film as claimed in claim 17, wherein the co-solvent comprises methanol, ethanol or isopropanol.

19. The method for forming a transparent flexible film as claimed in claim 16, wherein the clay comprises laponite, mica, vermiculite, montmorillonite, bentonite, saponite or hectorite.

20. The method for forming a transparent flexible film as claimed in claim 19, the clay comprises laponite.

21. The method for forming a transparent flexible film as claimed in claim 16, wherein $n_1$ is 2, $R_1$ is $C_2H_5$, and $R_2$ is H in the formula (I).

22. The method for forming a transparent flexible film as claimed in claim 16, wherein the water-soluble polymer comprises polyethylene oxide, polyvinyl alcohol, polyacrylic acid, polyvinyl pyrrolidone, water-solubility starch, hydroxypropyl methyl cellulose or chitosan.

23. The method for forming a transparent flexible film as claimed in claim 16, wherein $n_2$ is 23, and $R_3$ and $R_4$ are $CH_3$ in the formula (II).

24. The method for forming a transparent flexible film as claimed in claim 16, further comprising, in the step (d), adding a photoinitiator in the suspension.

* * * * *